United States Patent
Yanazawa et al.

(10) Patent No.: US 9,821,733 B2
(45) Date of Patent: Nov. 21, 2017

(54) WIRE HARNESS

(71) Applicant: YAZAKI CORPORATION, Tokyo (JP)

(72) Inventors: Kenta Yanazawa, Shizuoka (JP); Hidehiko Kuboshima, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/206,928

(22) Filed: Jul. 11, 2016

(65) Prior Publication Data

US 2017/0015258 A1    Jan. 19, 2017

(30) Foreign Application Priority Data

Jul. 13, 2015   (JP) ................ 2015-139548

(51) Int. Cl.
  *B60R 16/02*     (2006.01)
  *H02G 3/04*      (2006.01)

(52) U.S. Cl.
  CPC ....... *B60R 16/0215* (2013.01); *H02G 3/0468* (2013.01); *H02G 3/0481* (2013.01)

(58) Field of Classification Search
  USPC ..................................... 174/99 R
  See application file for complete search history.

(56) References Cited

U.S. PATENT DOCUMENTS 8,586,868 B2 * 11/2013 Liu ............... H02G 3/0481
                                                174/113 C

FOREIGN PATENT DOCUMENTS

| JP | 59-159126 U   | 10/1984 |
|----|---------------|---------|
| JP | 2006-231939 A | 9/2006  |
| JP | 2013-223287 A | 10/2013 |
| JP | 2014-91383 A  | 5/2014  |

OTHER PUBLICATIONS

Japanese Office Action for the related Japanese Patent Application No. 2015-139548 dated Apr. 17, 2017.

* cited by examiner

*Primary Examiner* — Dhirubhai R Patel
(74) *Attorney, Agent, or Firm* — Kenealy Vaidya LLP

(57) ABSTRACT

A wire harness includes a tubular shaped exterior member, a conductive path protected by the exterior member, and a vibration suppression member post-fitted to the conductive path and disposed inside the exterior member. The exterior member is formed into a shape having no slit. Ribs are formed in an outer circumferential surface of the vibration suppression member so as to be disposed at circumferential intervals. The rib is formed into a shape in which a front end surface thereof in a protruding direction thereof protrudes to a position near an inner surface of the exterior member or to a position contacting the inner surface.

3 Claims, 9 Drawing Sheets

WIRE HARNESS

CROSS REFERENCE TO RELATED APPLICATION

This application is based on Japanese Patent Application (No. 2015-139548) filed on Jul. 13, 2015, the contents of which are incorporated herein by reference. Also, all the references cited herein are incorporated as a whole.

BACKGROUND OF THE INVENTION

1. Technical Field

The present invention relates to a wire harness having a tubular exterior member, a conductive path or a plurality of conductive paths, and a vibration suppression member or a plurality of vibration suppression members post-fitted to the conductive path or paths and disposed inside the exterior member.

2. Background Art

A wire harness is used for establishing electric connection among devices mounted on a car. For example, as shown in FIG. 9, a wire harness 101 disclosed in the following Patent Literature 1 has a configuration including a corrugated tube 102 (exterior member), a plurality of electric wires 103 (conductive paths), and a vibration suppression member 104 (abnormal noise suppression member in Patent Literature 1) post-fitted to the electric wires 103 and disposed inside the corrugated tube 102.

The corrugated tube 102 is a tubular body, which is formed into a shape like a bellows tube. Specifically, the corrugated tube 102 is formed into a shape in which bellows concave portions 105 and bellows convex portions 106 are provided circumferentially, and the bellows concave portions 105 and the bellows convex portions 106 are continued alternately in an axial direction of the tube (that is, in a direction in which the electric wires 103 extend). In the corrugated tube 102 formed thus, a slit (not shown) is formed in the axial direction of the tube. The slit is formed to cut the corrugated tube 102 straightly from an opening portion on one end side to an opening portion on the other end side.

Each electric wire 103 has a configuration including a conductor and an insulator. The electric wires 103 that have been bundled are received inside the corrugated tube 102 through the slit. Incidentally, when the electric wires 103 that have been bundled are received in the corrugated tube 102, the slit has to be expanded largely.

The vibration suppression member 104 is provided to prevent abnormal noise from occurring from the inside of the corrugated tube 102. That is, the vibration suppression member 104 is provided to prevent the electric wires 103 from abutting against the inner surface of the corrugated tube 102 to thereby generate abnormal noise (for example, the vibration suppression member 104 is provided to suppress the electric wires 103 from rattling due to vibration during traveling to thereby abut against the inner surface of the corrugated tube 102 and generate abnormal noise). The vibration suppression member 104 is formed into a shape that can be post-fitted to the electric wires 103. Bellows concave portions 107 and bellows convex portions 108 are circumferentially formed in the outer circumferential surface of the vibration suppression member 104. The bellows concave portions 107 and the bellows convex portions 108 are formed into shapes that can be fitted to the inner surfaces of the bellows concave portions 105 and the bellows convex portions 106 of the corrugated tube 102.

Patent Literature 1 is JP-A-2013-223287.

SUMMARY OF THE INVENTION

In the aforementioned related-art technique, the vibration suppression member 104 is received in the corrugated tube 102. Due to those structures, it is therefore essential to form the slit in the corrugated tube 102. As a result, there may be problems as follows. That is, when the corrugated tube 102 has a slit, invasion of moisture into the corrugated tube 102 cannot be avoided even if the slit is covered with a tape wound thereon. In addition, an electric wire 103 located near the slit may be damaged due to flying stones or the like even if the slit can be covered with a tape wound thereon.

Inventors of the present invention considered that it is effective to use an exterior member having no slit and use a structure in which the vibration suppression member 104 can be inserted from an opening at an end portion of the exterior member. When the exterior member having no slit is used, in the structure of the vibration suppression member 104, for example, the size of the vibration suppression member 104 has to be reduced so that the vibration suppression member 104 can be received. However, in this case, when looseness with the exterior member increases, the vibration suppression member 104 cannot provide its original function sufficiently. On the contrary, when the reduction in size of the vibration suppression member 104 is suppressed as much as possible in order to suppress the looseness, the contact area with the exterior member increases in the vibration suppression member 104 where the bellows convex portions 108 are formed. As a result, a large insertion force may be required to affect the workability.

The present invention has been developed in consideration of the aforementioned situation. An object thereof is to provide a wire harness capable of suppressing relative vibration of conductive paths inside an exterior member even when the exterior member has no slit.

According to a first aspect of the invention, there is provided a wire harness including: an exterior member including a first opening portion and a second opening portion on both ends thereof and having a tubular shape; one or a plurality of conductive paths protected by the exterior member; and one or a plurality of vibration suppression members post-fitted to the one or the plurality of conductive paths and disposed inside the exterior member, wherein the exterior member is formed into a shape having no slit, and configured to receive the one or the plurality of conductive paths therethrough from the first opening portion toward the second opening portion, the one or the plurality of vibration suppression members are formed so that the one or the plurality of vibration suppression members can be inserted into the exterior member together with the one or the plurality of conductive paths, a plurality of ribs extending in a direction in which the one or the plurality of vibration suppression members are inserted into the exterior member are formed in an outer circumferential surface of the one vibration suppression member or each of the vibration suppression members so as to be disposed at predetermined circumferential intervals, and each of the plurality of ribs is formed into a shape in which a front end surface thereof in a protruding direction thereof protrudes to a position near an inner surface of the exterior member or to a position contacting the inner surface.

According to the first aspect, relative vibration of the conductive path or paths in the exterior member can be suppressed due to the structure of the vibration suppression member or members. In addition, in the vibration suppression member or members, the ribs can contact the inner surface of the exterior member. Thus, a large insertion force is not required.

According to a second aspect of the invention, in the wire harness according to that the first aspect, each of the plurality of ribs is formed to be tapered for the one or the plurality of vibration suppression members to be guided when inserted into the first opening portion.

According to the second aspect, the vibration suppression member or members can be inserted into the exterior member together with the conductive path or paths without being caught by the first opening portion of the exterior member.

According to a third aspect of the invention, in the wire harness according to that the first or the second aspect, a tape winding portion as a part on which a tape can be wound is formed in the one or the plurality of vibration suppression members.

According to the third aspect, the tape can be wound on the vibration suppression member or members so that the vibration suppression member or members can be prevented from dropping off from the conductive path or paths. In addition, the vibration suppression member or members on which the tape is wound can be fixed to the conductive path or paths.

According to the first aspect, there is an advantage that relative vibration of the conductive path or paths in the exterior member can be suppressed even when the exterior member has no slit. Therefore, there is an advantage that not only is it possible to prevent occurrence of abnormal noise in the same manner as in the related art, but it is also possible to prevent the conductive path or paths from abutting against the inner surface of the exterior member to be thereby damaged (for example, to prevent an insulator or insulators of the conductive path or paths from being shaved or injured). That is, there is an advantage that influence on the conductive path or paths can be reduced. In addition, according to the invention, a structure based on the ribs is used. Accordingly, there is an advantage that work relating to insertion can be performed easily. Further, according to the first aspect, due to use of the exterior member having no slit, there is an advantage that moisture can be prevented from invading or an advantage that damage caused by flying stones or the like can be prevented.

According to the second aspect, the following advantage can be further obtained in addition to the advantages according to the first aspect. That is, there is an advantage that insertion performance of the vibration suppression member or members into the exterior member can be improved.

According to the third aspect, the following advantage can be further obtained in addition to the advantages according to the first or second aspect. That is, there is an advantage that the vibration suppression member or members can be prevented from dropping off from the conductive path or paths or an advantage that the vibration suppression member or members can be fixed easily.

BRIEF DESCRIPTION OF THE DRAWINGS

FIG. 1A is a schematic view showing a state in which high-voltage wire harnesses have been arranged. FIG. 1B is a schematic view showing a state in which a low-voltage wire harness different from those in FIG. 1A has been arranged.

DETAILED DESCRIPTION OF THE EXEMPLARY EMBODIMENTS

A wire harness has a configuration including an exterior member having a tubular shape, a conductive path or a plurality of conductive paths protected by the exterior member, and a vibration suppression member or a plurality of vibration suppression members post-fitted to the conductive path or paths and disposed inside the exterior member. The exterior member is formed into a shape having no slit. In addition, the exterior member is formed into a shape to which the conductive path or paths can be inserted from an opening portion on one end side of the exterior member toward an opening portion on the other end side. On the other hand, each vibration suppression member is formed into such a shape that the vibration suppression member or members can be inserted into the exterior member together with the conductive path or paths. In addition, the vibration suppression member is formed into a shape with a plurality of ribs in the outer circumferential surface thereof. Each of the ribs is formed into a shape extending in a direction in which the vibration suppression member can be inserted into the exterior member. In addition, the ribs are formed to be disposed at predetermined intervals in the outer circumferential direction of the vibration suppression member. Each of the ribs is formed into a shape in which a front end surface of the rib in a protruding direction thereof can protrude to a position near the inner surface of the exterior member, or into a shape in which the front end surface can protrude to a position contacting to the inner surface of the exterior member.

EMBODIMENT

Figure 1A:
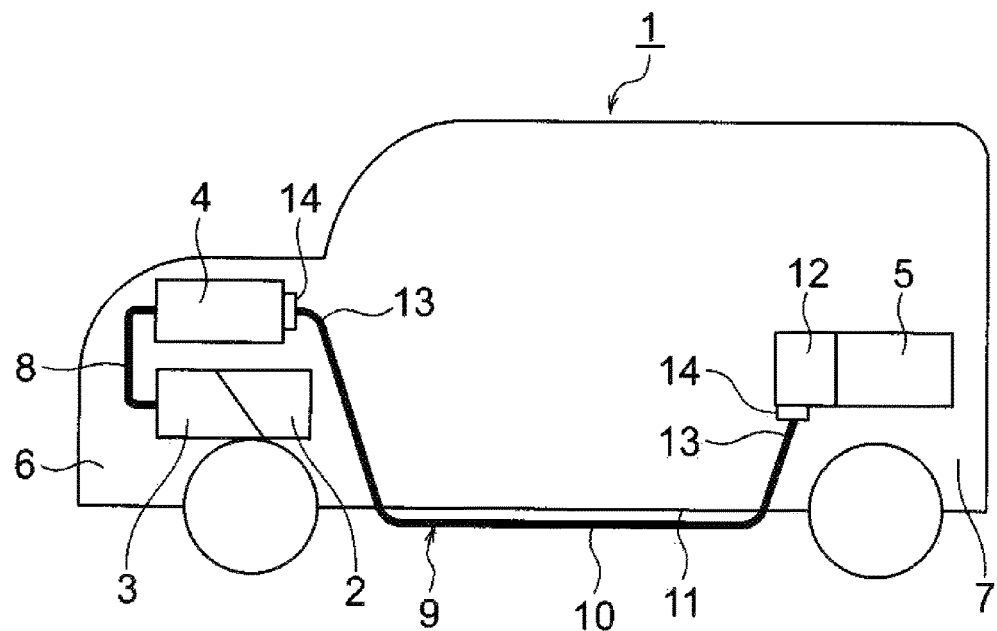
FIGS. 1A and 1B are views showing wire harnesses according to an embodiment of the invention.
Figure 1B:
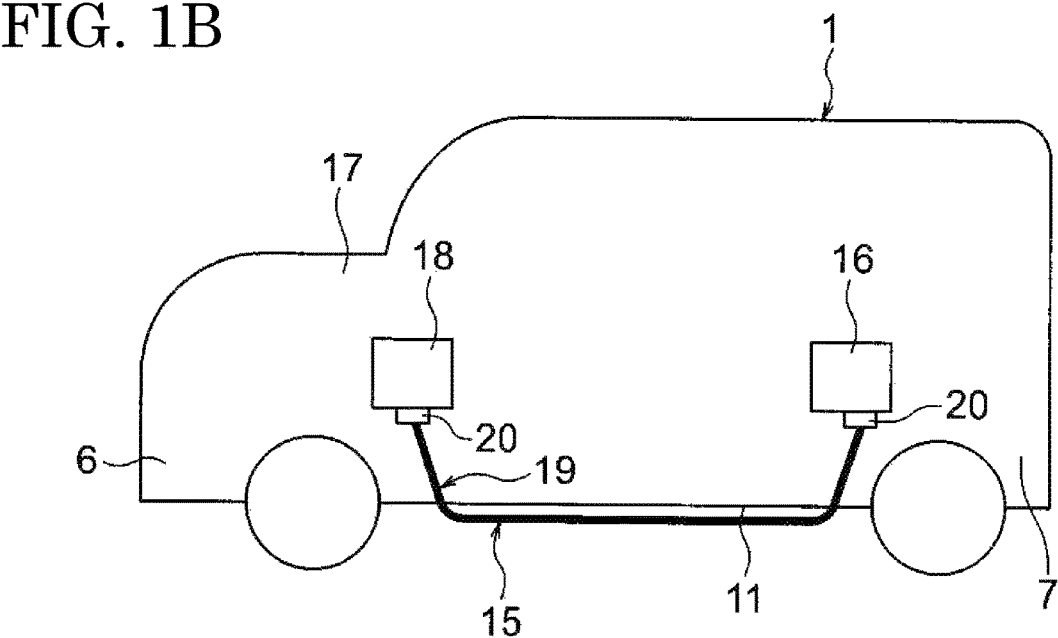
Figure 2:
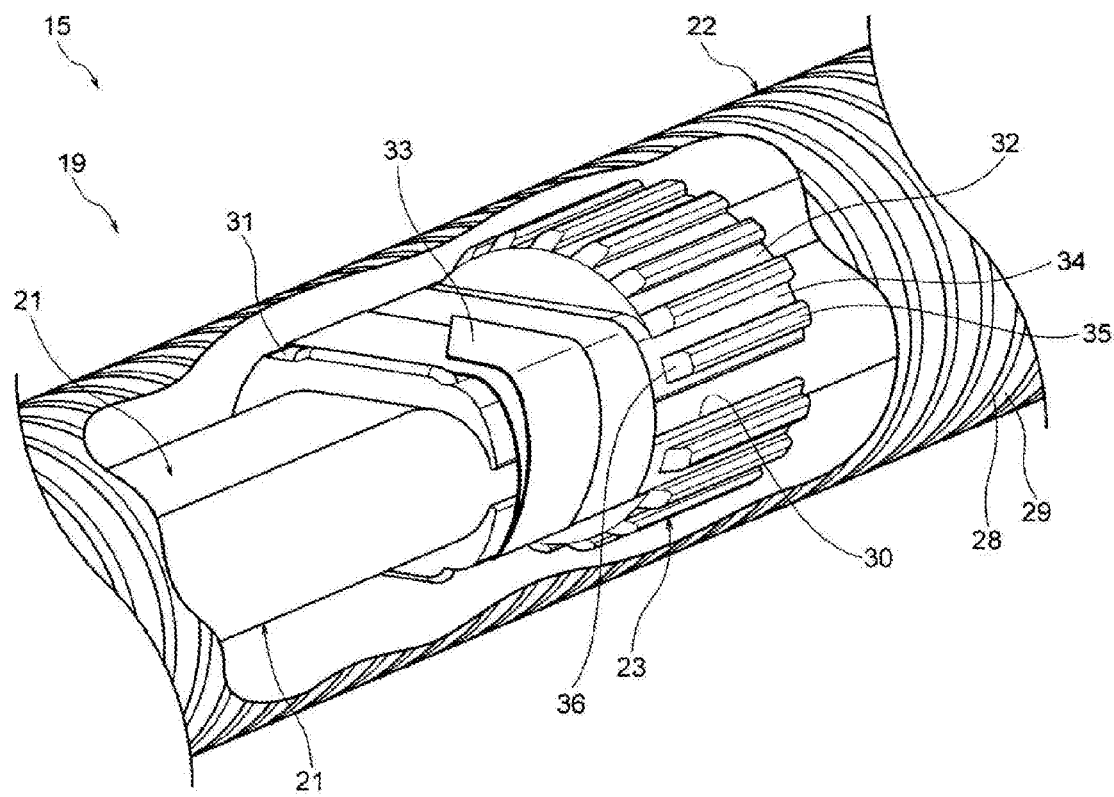
FIG. 2 is a perspective view showing the configuration of a harness body in a wire harness.
Figure 3:
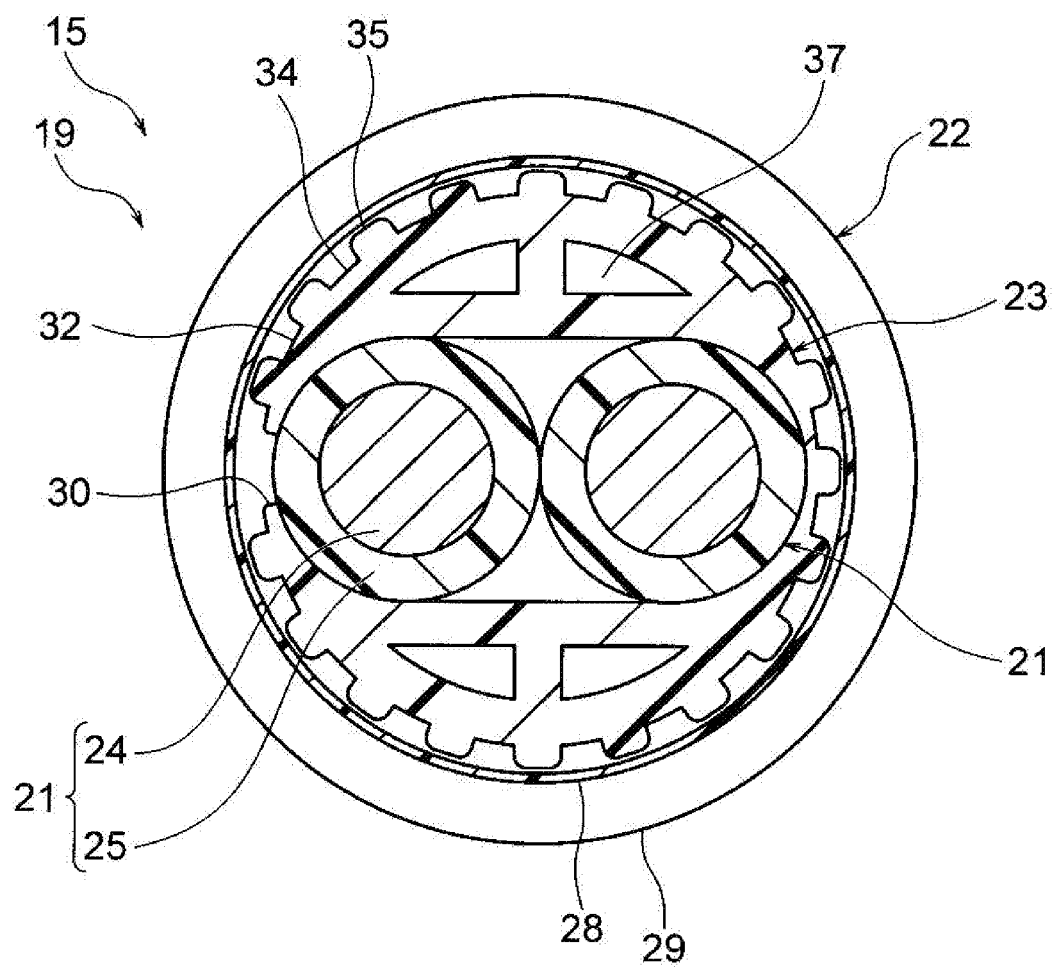
FIG. 3 is a sectional view of the harness body in FIG. 2.
Figure 4:
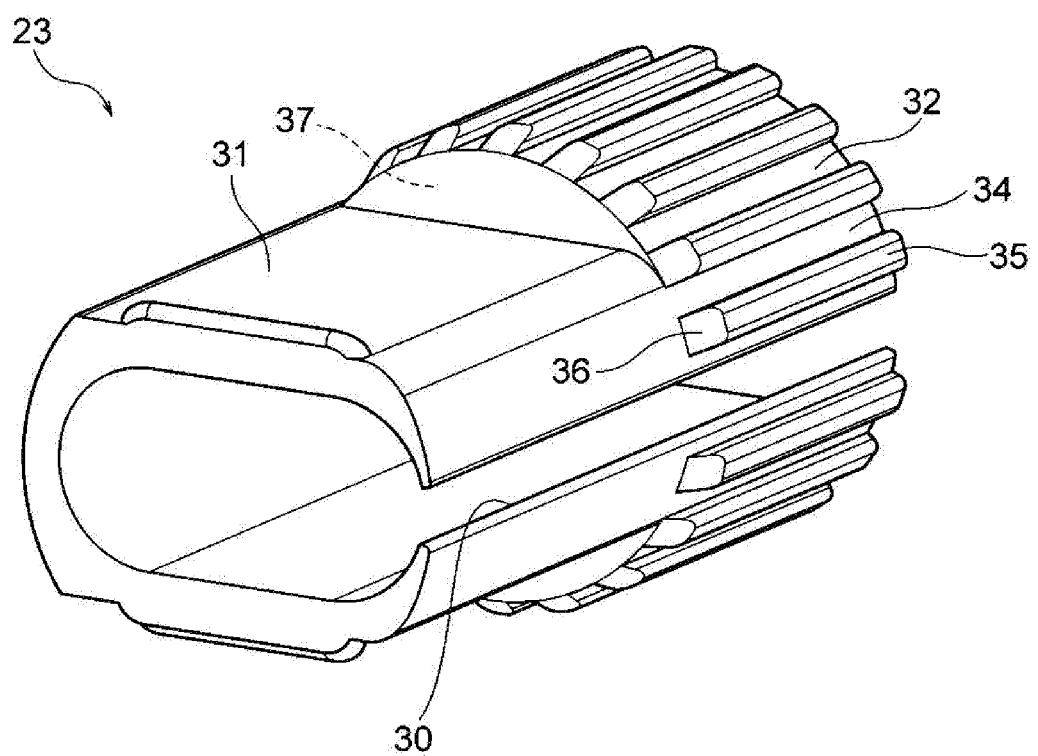
FIG. 4 is a perspective view of a vibration suppression member in FIG. 2.
Figure 5:
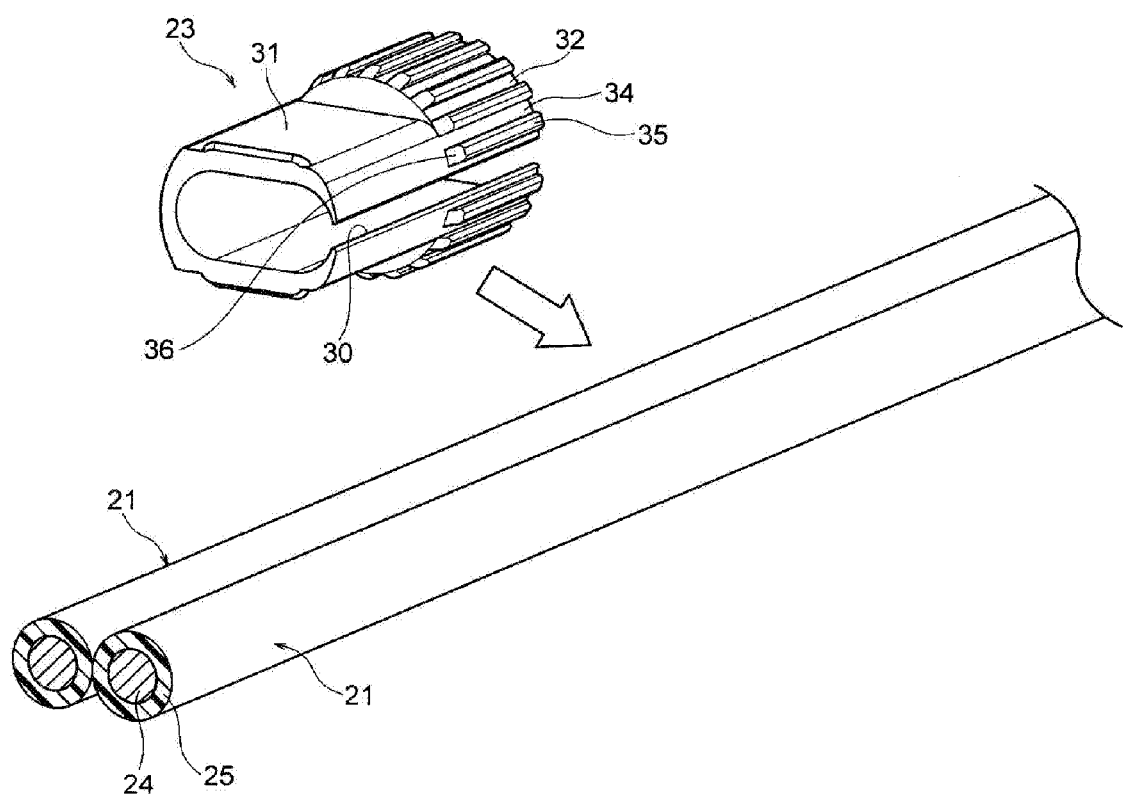
FIG. 5 is a perspective view showing a state in which the vibration suppression member has not been attached to conductive paths yet.
Figure 6:
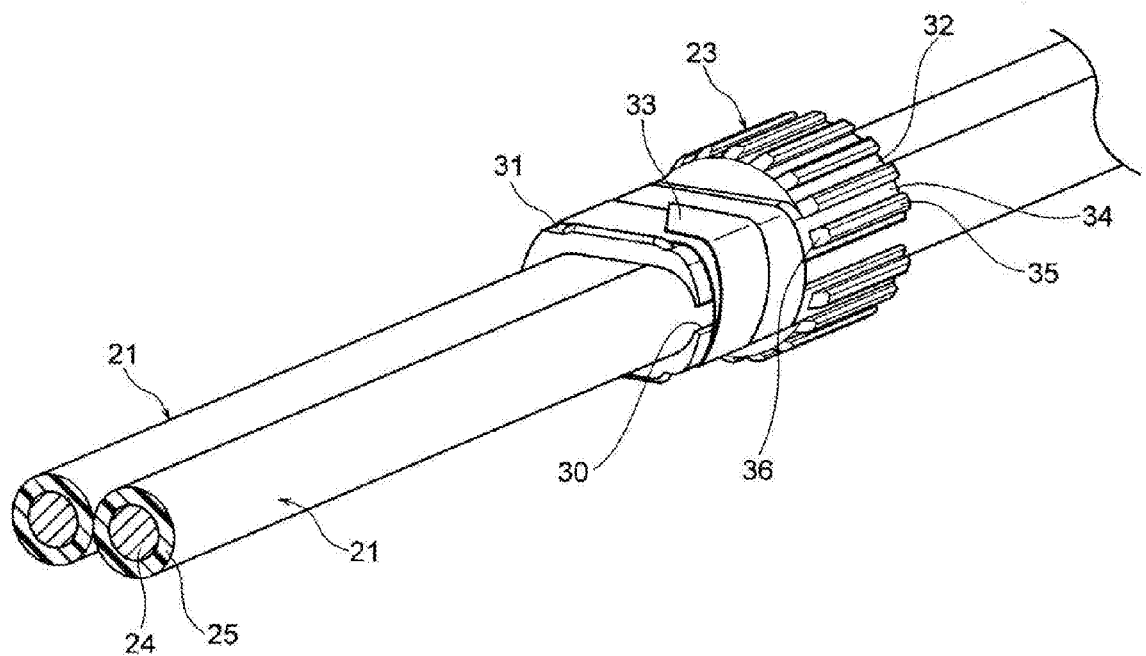
FIG. 6 is a perspective view showing a state in which the vibration suppression member has been attached and fixed to the conductive paths.
Figure 7:
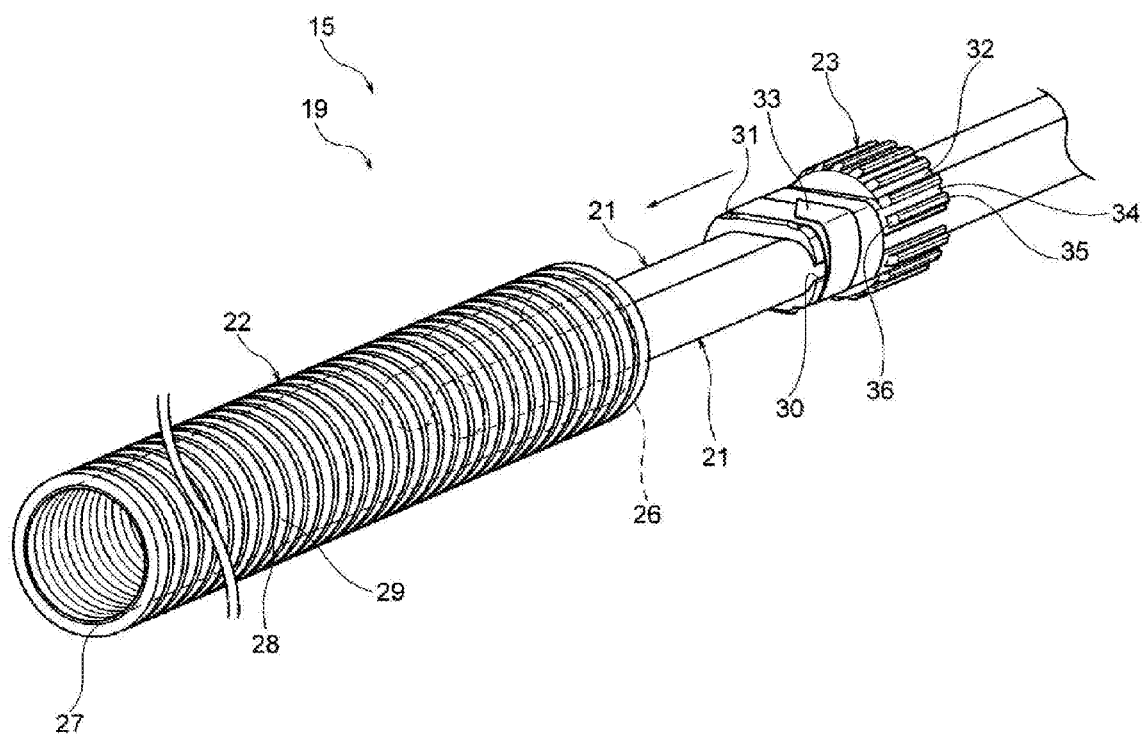
FIG. 7 is a perspective view showing a state in which the conductive paths are being inserted into an exterior member.
Figure 8:
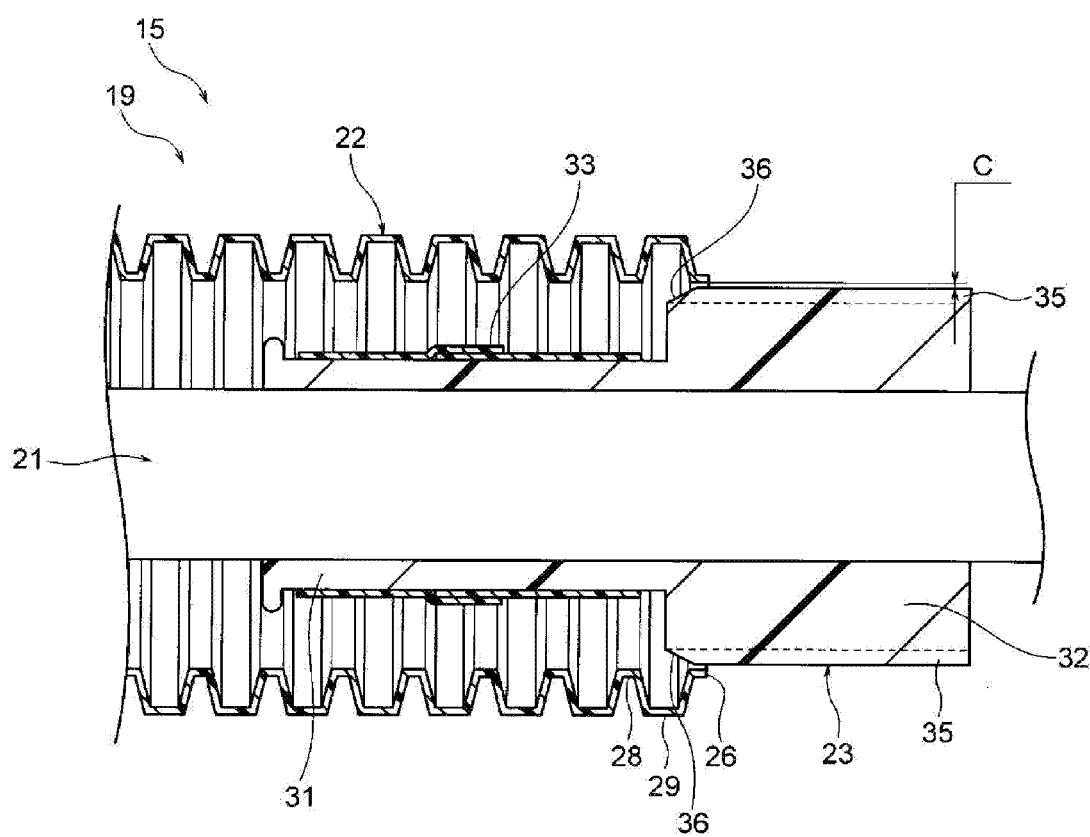
FIG. 8 is a sectional view showing a state in which the conductive paths are being inserted into the exterior member.
Figure 9:
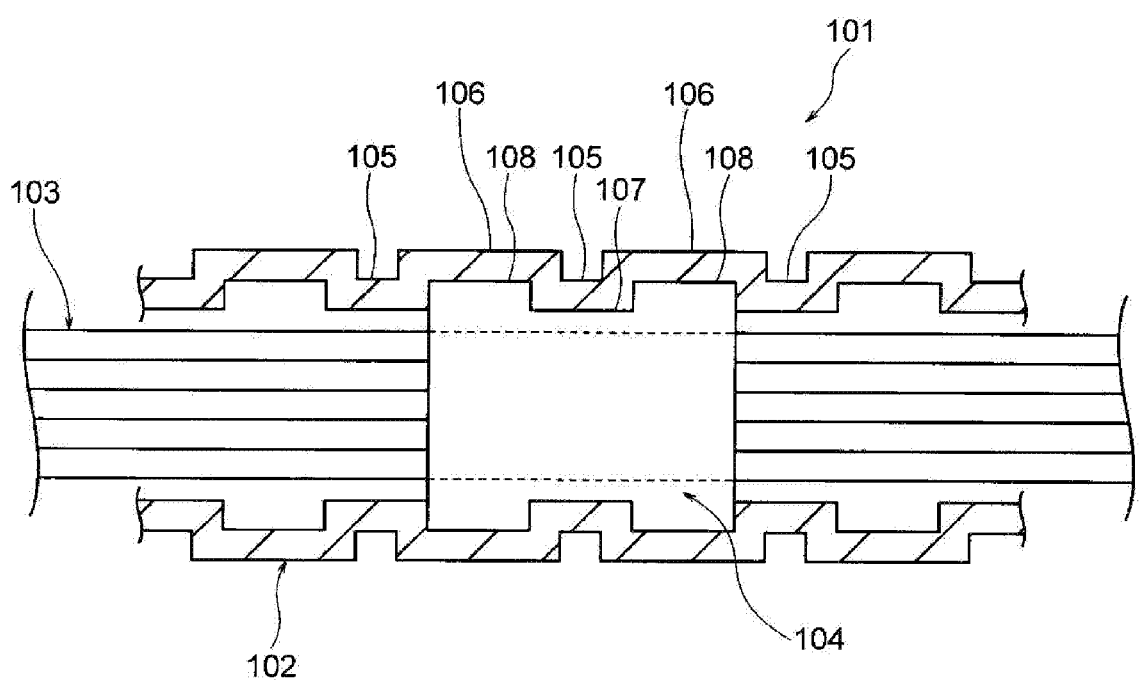
FIG. 9 is a view showing the configuration of a wire harness in a related-art example.

An embodiment will be described below with reference to the drawings. FIGS. 1A and 1B are views showing wire harnesses according to an embodiment of the invention. FIG. 1A is a schematic view showing a state in which high-voltage wire harnesses have been arranged. FIG. 1B is a schematic view showing a state in which a low-voltage wire harness different from those in FIG. 1A has been arranged. FIG. 2 is a perspective view showing the configuration of a harness body in a wire harness. FIG. 3 is a sectional view of the harness body in FIG. 2. FIG. 4 is a perspective view of a vibration suppression member in FIG. 2. FIG. 5 is a perspective view showing a state in which the vibration suppression member has not been attached to conductive paths yet. FIG. 6 is a perspective view showing a state in which the vibration suppression member has been attached and fixed to the conductive paths. FIG. 7 is a perspective view showing a state in which the conductive paths are being inserted into an exterior member. FIG. 8 is a sectional view showing a state in which the conductive paths are being inserted into the exterior member.

In the embodiment, the invention is applied to a wire harness to be arranged in a hybrid car (which may be an electric car, a general car traveling with an engine, or the like).

<About Configuration of Hybrid Car 1>

In FIG. 1A, the reference numeral 1 represents a hybrid car. The hybrid car 1 is a vehicle driven by a mixture of two power sources of an engine 2 and a motor unit 3. Electric power is supplied from a battery 5 (battery pack) to the motor unit 3 through an inverter unit 4. In the embodiment, the engine 2, the motor unit 3, and the inverter unit 4 are mounted in an engine room 6 where there are front wheels etc. also, the battery 5 is mounted in a car rear portion where there are rear wheels etc. (they may be mounted in a car cabin located at the rear of the engine room 6).

The motor unit 3 and the inverter unit 4 are connected through a high-voltage wire harness 8 (high-voltage motor cable). On the other hand, the battery 5 and the inverter unit 4 are also connected through a wire harness 9. An intermediate portion 10 of the wire harness 9 is arranged on a vehicle underfloor 11 (in a vehicle body). In addition, the intermediate portion 10 is arranged substantially in parallel to the vehicle underfloor 11. The vehicle underfloor 11 is a known body (vehicle body), which is also a so-called panel member. Through holes are formed in predetermined positions of the vehicle underfloor 11. The wire harness 9 is watertightly inserted into the through holes.

The wire harness 9 and the battery 5 are connected through a junction block 12 which is provided in the battery 5. An external connection unit such as a shielded connector 14 disposed in a harness end 13 on the rear end side of the wire harness 9 is electrically connected to the junction block 12. On the other hand, the wire harness 9 and the inverter unit 4 are electrically connected through an external connection unit such as a shielded connector 14 disposed in a harness end 13 on the front end side of the wire harness 9.

The motor unit 3 has a configuration including a motor and a generator. On the other hand, the inverter unit 4 has a configuration including an inverter and a converter. The motor unit 3 is formed as a motor assembly including a shield case. The inverter unit 4 is also formed as an inverter assembly including a shield case. The battery 5 is a modularized one based on Ni-MH or Li-ion. For example, an electric storage device such as a capacitor may be used. Not to say, the battery 5 is not limited especially as long as it can be used in the hybrid car 1 or an electric car.

In FIG. 1B, the reference numeral 15 represents a wire harness. The wire harness 15 is a low-voltage one (for low-voltage application). The wire harness 15 is provided for electrically connecting a low-voltage battery 16 in the car rear portion 7 of the hybrid car 1 with an auxiliary device 18 (device) mounted in a car front portion 17. The wire harness 15 is arranged passing through the vehicle underfloor 11 in the same manner as the wire harness 9 in FIG. 1A (this is an example, and the wire harness 15 may be arranged passing through the vehicle cabin side).

As shown in FIGS. 1A and 1B, the high-voltage wire harnesses 8 and 9 and the low-voltage wire harness 15 are arranged in the hybrid car 1. The invention may be applied to any of the wire harnesses. The low-voltage wire harness 15 will be explained below as a typical example.

<About Configuration of Wire Harness 15>

In FIG. 1B, the long wire harness 15 arranged passing through the vehicle underfloor 11 has a configuration including a harness body 19, and connectors 20 (external connection units) disposed on opposite ends of the harness body 19 respectively. In addition, the wire harness 15 is configured including fixing members (such as clamps) for arranging the wire harness 15 at predetermined positions, and not-shown water stopper members (such as grommets).

<About Configuration of Harness Body 19>

In FIG. 2 and FIG. 3, the harness body 19 has a configuration including two conductive paths 21, an exterior member 22 for receiving and protecting the two conductive paths 21, and a vibration suppression member 23 or a plurality of vibration suppression members 23 post-fitted to the two conductive paths 21 and disposed inside the exterior member 22. Incidentally, although the number of conductive paths 21 is two in the embodiment, this is merely an example. In addition, as the structure of the exterior member 22, one that can receive and protect the high-voltage wire harness 9 together may be used.

First, the configuration and structure of each conductive path 21 in the harness body 19 will be explained. Next the structure of the exterior member 22 according to the invention will be explained. Finally, the structure of each vibration suppression member 23 will be explained.

<About Configuration and Structure of Conductive Path 21>

In FIG. 2 and FIG. 3, each conductive path 21 has a configuration including a conductive conductor 24, and an insulating insulator 25 with which the conductor 24 is covered. The conductor 24 is formed out of copper, a copper alloy, aluminum or an aluminum alloy and into a circular shape in section. The conductor 24 may have a conductor structure in which strands have been twisted, or a rod-like conductor structure that has a rectangular shape or a circular (round) shape in section (for example, a conductor structure that serves as a rectangular single core or a circular single core. In this case, the electric wire itself also has a rod-like shape). The insulator 25 made of an insulating resin material is formed on the outer surface of the aforementioned conductor 24 by extrusion molding.

The insulator 25 is formed on the outer circumferential surface of the conductor by extrusion molding using a thermoplastic resin material. The insulator 25 is formed as coating having a circular shape in section. The insulator 25 is formed with a predetermined thickness. Various kinds of known resins may be used as the aforementioned thermoplastic resin. For example, one may be selected suitably from polymers such as polyvinylchloride resin, polyethylene resin, polypropylene resin, etc.

<About Structure of Exterior Member 22 in the Invention>

In FIG. 2, FIG. 3, FIG. 7, and FIG. 8, the exterior member 22 is formed into a single straight tubular shape by resin molding (the exterior member 22 that has not been used yet is straight. Incidentally, the material of the exterior member 22 is not limited to resin, but may be metal). In addition, the exterior member 22 is formed into an unslitted shape. To say other words, the exterior member 22 is formed into a shape having no slit (or formed into a shape that is not a divided tube). Further, the exterior member 22 is formed into a shape having circular opening portions at its opposite ends, that is, an opening portion 26 (first opening portion) on one end side and an opening portion 27 (second opening portion) on the other end side (see FIG. 7). Furthermore, the exterior member 22 is formed into a shape to which the two conductive paths 21 and the vibration suppression member or members 23 can be inserted together.

In the embodiment, a known corrugated tube is used as the exterior member 22. The exterior member 22 configured thus is formed into a shape like a bellows tube as illustrated.

Specifically, the exterior member 22 is formed into a bellows-tube shape in which bellows concave portions 28 and bellows convex portions 29 are provided circumferentially, and the bellows concave portions 28 and the bellows convex portions 29 are continued alternately in the axial direction of the tube (which coincides with the extending direction and the insertion direction of the conductive paths 21).

The exterior member 22 is formed with a required length corresponding to a shape of attachment to a vehicle (which is a shape of a destination where the wire harness should be wired, or a shape of a target where the wire harness should be fixed). The exterior member 22 is formed so that the exterior member 22 can be bent at a desired angle when the wire harness 15 is packed or transported or when the wire harness 15 is arranged and wired on a vehicle. That is, the exterior member 22 is formed so that the exterior member 22 can be bent and formed into a bent shape and, not to say, the exterior member 22 can be restored to its original straight state (state when the exterior member 22 was formed by resin molding).

Incidentally, the exterior member 22 does not have to be entirely formed as a known corrugated tube. For example, in the exterior member 22, flexible tube portions having flexibility, and straight tube portions serving as parts in which the conductive paths 21 can be arranged straightly may be disposed alternately. Further, the exterior member 22 does not have to have a circular shape as its end portion opening shape or its sectional shape. For example, the exterior member 22 may have another shape such as an oval shape, an elliptic shape, a substantially rectangular shape, etc. In the exterior member 22, a desired shape may be used in accordance with the wiring path where the wire harness 15 is arranged.

<About Structure of Vibration Suppression Member 23>

In FIG. 2 to FIG. 4, each vibration suppression member is a member made of synthetic resin. The vibration suppression member 23 is formed into a shape that can be post-fitted to the two conductive paths 21. In addition, the vibration suppression member 23 is formed into a shape that can be inserted into the exterior member 22. Further, the vibration suppression member 23 is also formed so that relative vibration of the conductive paths 21 in the exterior member 22 can be suppressed when the vibration suppression member 23 is disposed inside the exterior member 22. The structure of the vibration suppression member 23 will be described below more in detail.

The vibration suppression member 23 has a substantially cylindrical shape whose length can be reduced in the extending direction of the conductive paths 21 (which coincides with the aforementioned axial direction of the tube or the insertion direction of the conductive paths 21). The vibration suppression member 23 is formed so that the vibration suppression member 23 can be attached to the two conductive paths 21 by fitting from the outside of the conductive paths that have been arranged in parallel. The vibration suppression member 23 has an internal space having an oval shape in section. A slit 30 is formed in one side portion in the direction of the major axis. The vibration suppression member 23 has flexibility high enough to open the slit 30 at least correspondingly to the thickness of the conductive paths 21. When observed from the outside, the vibration suppression member 23 has two different parts. One of the parts is a tape winding portion 31, and the other part is a relative vibration suppression portion 32.

The tape winding portion 31 is formed in the outer circumferential surface of the vibration suppression member 23 so as to serve as a part on which a fixing tape 33 (see FIG. 6) can be wound. That is, the tape winding portion 31 is formed as a part for fixation by taping. The vibration suppression member 23 is fixed by winding of the tape 33. It is therefore a matter of course that the vibration suppression member 23 can be fixed to the conductive paths 21 easily. When the tape 33 is wound on the tape winding portion 31, the vibration suppression member 23 can be prevented from dropping off from the conductive paths 21.

The relative vibration suppression portion 32 is, for example, formed into an illustrated shape, including a circular outer circumferential surface 34 and a plurality of ribs 35. Due to the outer circumferential surface 34, the vibration suppression member 23 can be bulged and opposed to the inner surface (inner circumferential surface) of the exterior member 22. The ribs 35 protrude from the outer circumferential surface 34. The relative vibration suppression portion 32 is formed into a circular shape corresponding to the exterior member 22 whose sectional shape is circular in the embodiment.

When the relative vibration suppression portion 32 is inserted and disposed inside the exterior member 22, vibration of the relative vibration suppression portion 32 itself is suppressed. When the vibration of the relative vibration suppression portion 32 itself is suppressed, relative vibration of the two conductive paths 21 to the exterior member 22 is also suppressed.

The plurality of ribs 35 are formed to extend in the aforementioned insertion direction. In addition, the ribs 35 are formed to be located at predetermined intervals in the outer circumferential direction of the vibration suppression member 23. Incidentally, the number of ribs 35 is not limited to the illustrated number as long as the vibration of the relative vibration suppression portion 32 itself can be suppressed. The ribs 35 are formed as parts effective in reducing the contact area with the inner surface (inner circumferential surface) of the exterior member 22.

Each of the ribs 35 is formed into a shape in which a front end surface of the rib in its protruding direction can protrude to a position near the inner surface (inner circumferential surface) of the exterior member 22 (or formed into a shape in which the front end surface can protrude to a position contacting to the inner surface of the exterior member 22, in consideration of dimensional errors). A taper 36 is further formed in the ribs 35 formed thus. The taper 36 is formed to be disposed at least at one end of the ribs 35 in the aforementioned extending direction. The taper 36 is formed as apart for guiding the vibration suppression member 23 when the vibration suppression member 23 is inserted into the exterior member 22. Due to the formation of the taper 36, the vibration suppression member 23 can be prevented from being caught by the opening portion 26 on the one end side of the exterior member 22 to thereby reduce the workability. The taper 36 is formed as a part effective in improving the workability when the vibration suppression member 23 is inserted.

Incidentally, as for the relative vibration suppression portion 32, the reference numeral 37 in FIG. 3 represents a reduced thickness for preventing a sink mark during resin molding.

<About Installation of Harness Body 19>

Steps (first step to second step) in which the harness body 19 is installed in a state shown in FIG. 2 and FIG. 3 will be described below. Refer to FIG. 5 to FIG. 8 in the following description.

In FIG. 5, the following work is performed in the first step. That is, the vibration suppression member 23 is disposed adjacently to the conductive paths 21 that have been arranged in parallel. Then, in the state where the slit 30 can be opened, the vibration suppression member 23 is attached to a predetermined position of the conductive paths 21 by external fitting. In addition, the following work is performed as shown in FIG. 6. That is, the tape 33 is wound on the tape winding portion 31 so as to fix the vibration suppression member 23 to the two conductive paths 21.

In FIG. 7, in the second step, the following work is performed. That is, the two conductive paths 21 to which the vibration suppression member 23 has been attached and fixed are inserted from the opening portion 26 on the one end side of the exterior member 22 toward the opening portion 27 on the other end side. The vibration suppression member 23 has the taper 36 as shown in FIG. 8. Therefore, there is no fear that the ribs 35 may be caught by the opening portion 26 on the one end side to thereby reduce the workability. In addition, due to the existence of the ribs 35, the contact area with the inner surface (inner circumferential surface) of the exterior member 22 becomes comparatively small. Therefore, a large insertion force is not required. Further, a clearance C is set between the front end surface of each rib 35 in its protruding direction and the inner surface of the exterior member 22 as shown in FIG. 8. It is therefore possible to insert the conductive paths 21 smoothly.

<About Summary of Harness Body 19>

Description has been made above with reference to FIG. 1A to FIG. 8. The harness body 19 in the wire harness 15 has the configuration including the exterior member 22 having a tubular shape, the two conductive paths 21 protected by the exterior member 22, and one or a plurality of the vibration suppression members 23 post-fitted to the two conductive paths 21 and disposed inside the exterior member 22.

The exterior member 22 is formed into a shape having no slit. In addition, the exterior member 22 is formed into a shape to which the two conductive paths 21 can be inserted from an opening portion 26 at one end toward an opening portion 27 at the other end. On the other hand, the vibration suppression member 23 is formed into a shape that can be inserted into the exterior member 22 together with the two conductive paths 21. In addition, the vibration suppression member 23 is formed into a shape including a plurality of ribs 35 in an outer circumferential surface 34 of a relative vibration suppression portion 32. Each of the ribs 35 is formed into a shape extending in the insertion direction of the vibration suppression member 23. In addition, the ribs 35 are formed to be located at predetermined intervals in the outer circumferential direction of the vibration suppression member 23. Each of the ribs 35 is formed into a shape in which a front end surface of the rib in its protruding direction protrudes to a position near the inner surface (inner circumferential surface) of the exterior member 22.

<About Effect of the Embodiment>

According to the embodiment of the invention, relative vibration of the two conductive paths 21 in the exterior member 22 is suppressed by the structure of the vibration suppression member 23. In addition, according to the invention, of the vibration suppression member 23, the plurality of ribs 35 can contact the inner surface of the exterior member 22. Therefore, a large insertion force is not required.

Thus, according to the embodiment of the invention, the relative vibration of the two conductive paths 21 inside the exterior member 22 can be suppressed even when an exterior member having no slit is used as the exterior member 22. As a result, not only is it possible to prevent abnormal noise from occurring in the same manner as in the related art, but it is also possible to prevent the two conductive paths 21 from abutting against the inner surface (inner circumferential surface) of the exterior member 22 to be thereby damaged (for example, to prevent insulators of the conductive paths 21 from being shaved or injured). That is, influence on the two conductive paths 21 can be reduced. In addition, according to the invention, the contact structure based on the ribs 35 is used. Accordingly, work relating to insertion can be performed easily. Further, according to the invention, due to use of the exterior member 22 having no slit, moisture can be prevented from invading or damage caused by flying stones or the like can be prevented.

It is a matter of course that the invention can be carried out with various changes without departing from the gist of the invention.

What is claimed is:

1. A wire harness comprising:
an exterior member including a first opening portion and a second opening portion on both ends thereof and having a tubular shape;
a conductive path protected by the exterior member; and
a vibration suppression member attached to the conductive path on an outside of the conductive path, and disposed inside the exterior member, wherein
the exterior member is formed into a shape having no slit, and configured to receive the conductive path therethrough from the first opening portion toward the second opening portion, the vibration suppression member is formed so that the vibration suppression member can be inserted into the exterior member together with the conductive path,
a plurality of ribs extending in a direction in which the vibration suppression member is inserted into the exterior member are formed in an outer circumferential surface of the vibration suppression member so as to be disposed at predetermined circumferential intervals, and
each of the plurality of ribs is formed into a shape in which a front end surface of each of the plurality of ribs in a protruding direction of each of the plurality of ribs protrudes to a position near an inner surface of the exterior member or to a position contacting the inner surface.

2. The wire harness according to claim 1, wherein the each of the plurality of ribs is formed to be tapered for the vibration suppression member to be guided when inserted into the first opening portion.

3. The wire harness according to claim 1, wherein a tape winding portion as a part on which a tape can be wound is formed in the vibration suppression member.

* * * * *